US012237992B2

(12) United States Patent
Xiong

(10) Patent No.: US 12,237,992 B2
(45) Date of Patent: Feb. 25, 2025

(54) PATH COMPUTATION METHOD AND APPARATUS, STORAGE MEDIUM, AND ELECTRONIC DEVICE

(71) Applicant: ZTE Corporation, Shenzhen (CN)

(72) Inventor: Quan Xiong, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/275,647

(22) PCT Filed: Apr. 28, 2022

(86) PCT No.: PCT/CN2022/089969
§ 371 (c)(1),
(2) Date: Aug. 3, 2023

(87) PCT Pub. No.: WO2022/237562
PCT Pub. Date: Nov. 17, 2022

(65) Prior Publication Data
US 2024/0297841 A1 Sep. 5, 2024

(30) Foreign Application Priority Data
May 8, 2021 (CN) .......................... 202110502498.1

(51) Int. Cl.
H04L 45/121 (2022.01)
H04L 45/00 (2022.01)
H04L 45/50 (2022.01)

(52) U.S. Cl.
CPC ............ H04L 45/121 (2013.01); H04L 45/50 (2013.01); H04L 45/566 (2013.01)

(58) Field of Classification Search
CPC ...... H04L 45/121; H04L 45/50; H04L 45/566
USPC .......................................................... 709/238
See application file for complete search history.

(56) References Cited

U.S. PATENT DOCUMENTS 10,757,012 B2    8/2020    Lazzeri et al.

FOREIGN PATENT DOCUMENTS

| CN | 108989065 A | 12/2018 |
| CN | 110474853 A | 11/2019 |
| CN | 110677918 A | 1/2020 |
| CN | 111970759 A | 11/2020 |

(Continued)

OTHER PUBLICATIONS

International Search Report for corresponding application PCT/CN2022/089969 filed Apr. 28, 2022; Mail date Jul. 26, 2022.

(Continued)

Primary Examiner — Glenford J Madamba
(74) Attorney, Agent, or Firm — CANTOR COLBURN LLP

(57) ABSTRACT

Provided in embodiments of the present disclosure are a path computation method and apparatus, a storage medium, and an electronic device. The method includes: computing, by a controller, a forwarding path and forwarding delay information according to an end-to-end delay requirement; and sending, by the controller, the forwarding path and the forwarding delay information to a device side. Accordingly, the problem that a network path or route computed based on a network graph cannot satisfy service requirements in the related art can be solved, and a determined target path can satisfy the service requirements.

15 Claims, 7 Drawing Sheets

(56) References Cited

FOREIGN PATENT DOCUMENTS

| | | | | |
|---|---|---|---|---|
| CN | 112532520 B | * | 4/2022 | ............. H04L 45/04 |
| WO | WO-2018219298 A1 | * | 12/2018 | |

OTHER PUBLICATIONS

European Search Report for corresponding application EP22806531; Report dated May 29, 2024.

* cited by examiner

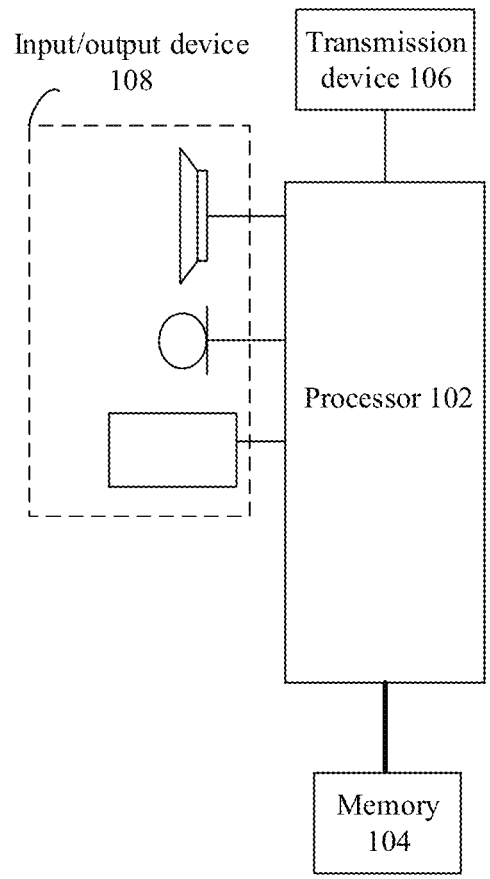

Fig. 3

```
┌─────────────────────────────────────────────────────────┐
│ A device side receives a forwarding path and forwarding delay │
│ information sent by a controller, where the forwarding path and │─── S302
│ the forwarding delay information are computed by the controller │
│         according to an end-to-end delay requirement    │
└─────────────────────────────────────────────────────────┘
```

Fig. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Type=TBD            |            Length             |
+-+-+-+-+-+-+-+-+-+-+-+-+-+-+-+-+-+-+-+-+-+-+-+-+-+-+-+-+-+-+-+-+
|                                                               |
//                      LSP Extended Flags                     //
|                                                             |T|
+-+-+-+-+-+-+-+-+-+-+-+-+-+-+-+-+-+-+-+-+-+-+-+-+-+-+-+-+-+-+-+-+
```

Fig. 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Type=TBD            |          Length=12            |
+-+-+-+-+-+-+-+-+-+-+-+-+-+-+-+-+-+-+-+-+-+-+-+-+-+-+-+-+-+-+-+-+
|                    Maximum End-to-end Delay                   |
+-+-+-+-+-+-+-+-+-+-+-+-+-+-+-+-+-+-+-+-+-+-+-+-+-+-+-+-+-+-+-+-+
|                    Minimum End-to-end Delay                   |
+-+-+-+-+-+-+-+-+-+-+-+-+-+-+-+-+-+-+-+-+-+-+-+-+-+-+-+-+-+-+-+-+
|               Maximum End-to-end Delay Variation              |
+-+-+-+-+-+-+-+-+-+-+-+-+-+-+-+-+-+-+-+-+-+-+-+-+-+-+-+-+-+-+-+-+
```

Fig. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Ver  |  Flags |T|   Keepalive   |   DeadTimer   |     SID     |
+-+-+-+-+-+-+-+-+-+-+-+-+-+-+-+-+-+-+-+-+-+-+-+-+-+-+-+-+-+-+-+-+
|                                                               |
//                       Optional TLVs                         //
|                                                               |
+-+-+-+-+-+-+-+-+-+-+-+-+-+-+-+-+-+-+-+-+-+-+-+-+-+-+-+-+-+-+-+-+
```

Fig. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|L|    Type     |     Length      |   IPv4 address (4 bytes)    |
+-+-+-+-+-+-+-+-+-+-+-+-+-+-+-+-+-+-+-+-+-+-+-+-+-+-+-+-+-+-+-+-+
|   IPv4 address (continued)   |  Prefix Length  |     Resvd    |
+-+-+-+-+-+-+-+-+-+-+-+-+-+-+-+-+-+-+-+-+-+-+-+-+-+-+-+-+-+-+-+-+
|                        delay (optional)                       |
+-+-+-+-+-+-+-+-+-+-+-+-+-+-+-+-+-+-+-+-+-+-+-+-+-+-+-+-+-+-+-+-+
```

Fig. 8

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|L|   Type          |     Length      |   IPv6 address (16 bytes)  |
+-+-+-+-+-+-+-+-+-+-+-+-+-+-+-+-+-+-+-+-+-+-+-+-+-+-+-+-+-+-+-+-+
|                    IPv6 address (continued)                    |
+-+-+-+-+-+-+-+-+-+-+-+-+-+-+-+-+-+-+-+-+-+-+-+-+-+-+-+-+-+-+-+-+
|                    IPv6 address (continued)                    |
+-+-+-+-+-+-+-+-+-+-+-+-+-+-+-+-+-+-+-+-+-+-+-+-+-+-+-+-+-+-+-+-+
|                    IPv6 address (continued)                    |
+-+-+-+-+-+-+-+-+-+-+-+-+-+-+-+-+-+-+-+-+-+-+-+-+-+-+-+-+-+-+-+-+
|   IPv6 address (continued)    |  Prefix Length  |    Resvd     |
+-+-+-+-+-+-+-+-+-+-+-+-+-+-+-+-+-+-+-+-+-+-+-+-+-+-+-+-+-+-+-+-+
|                       delay (optional)                         |
+-+-+-+-+-+-+-+-+-+-+-+-+-+-+-+-+-+-+-+-+-+-+-+-+-+-+-+-+-+-+-+-+
```

Fig. 9

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Type=26              |           Length=4             |
+-+-+-+-+-+-+-+-+-+-+-+-+-+-+-+-+-+-+-+-+-+-+-+-+-+-+-+-+-+-+-+-+
|         Reserved              |           Flags            |T| |
+-+-+-+-+-+-+-+-+-+-+-+-+-+-+-+-+-+-+-+-+-+-+-+-+-+-+-+-+-+-+-+-+
```

Fig. 10

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|L|   Type=36   |     Length    |   NT  |     Flags     |F|S|C|M|
+-+-+-+-+-+-+-+-+-+-+-+-+-+-+-+-+-+-+-+-+-+-+-+-+-+-+-+-+-+-+-+-+
|                         SID (optional)                         |
+-+-+-+-+-+-+-+-+-+-+-+-+-+-+-+-+-+-+-+-+-+-+-+-+-+-+-+-+-+-+-+-+
//                    NAI (variable, optional)                  //
+-+-+-+-+-+-+-+-+-+-+-+-+-+-+-+-+-+-+-+-+-+-+-+-+-+-+-+-+-+-+-+-+
|                         delay (optional)                       |
+-+-+-+-+-+-+-+-+-+-+-+-+-+-+-+-+-+-+-+-+-+-+-+-+-+-+-+-+-+-+-+-+
```

Fig. 11

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Type=TBD             |            Length             |
+-+-+-+-+-+-+-+-+-+-+-+-+-+-+-+-+-+-+-+-+-+-+-+-+-+-+-+-+-+-+-+-+
|          Reserved             |        Flags          |N|X|T|
+-+-+-+-+-+-+-+-+-+-+-+-+-+-+-+-+-+-+-+-+-+-+-+-+-+-+-+-+-+-+-+-+
|  MSD-Type   |   MSD-Value    |   MSD-Type   |   MSD-Value    |
+-+-+-+-+-+-+-+-+-+-+-+-+-+-+-+-+-+-+-+-+-+-+-+-+-+-+-+-+-+-+-+-+
//                             ...                              //
+-+-+-+-+-+-+-+-+-+-+-+-+-+-+-+-+-+-+-+-+-+-+-+-+-+-+-+-+-+-+-+-+
|  MSD-Type   |   MSD-Value    |           Padding              |
+-+-+-+-+-+-+-+-+-+-+-+-+-+-+-+-+-+-+-+-+-+-+-+-+-+-+-+-+-+-+-+-+
```

Fig. 12

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|L|  Type=TBD   |    Length     |      NT       |    Flags      |V|T|F|S|
+-+-+-+-+-+-+-+-+-+-+-+-+-+-+-+-+-+-+-+-+-+-+-+-+-+-+-+-+-+-+-+-+
|           Reserved            |       Endpoint Behavior       |
+-+-+-+-+-+-+-+-+-+-+-+-+-+-+-+-+-+-+-+-+-+-+-+-+-+-+-+-+-+-+-+-+
|                                                               |
|                      SRv6 SID (optional)                      |
|                          (128-bit)                            |
|                                                               |
+-+-+-+-+-+-+-+-+-+-+-+-+-+-+-+-+-+-+-+-+-+-+-+-+-+-+-+-+-+-+-+-+
//                    NAI (variable, optional)                //
+-+-+-+-+-+-+-+-+-+-+-+-+-+-+-+-+-+-+-+-+-+-+-+-+-+-+-+-+-+-+-+-+
|                     SID Structure (optional)                  |
+-+-+-+-+-+-+-+-+-+-+-+-+-+-+-+-+-+-+-+-+-+-+-+-+-+-+-+-+-+-+-+-+
|                         delay (optional)                      |
+-+-+-+-+-+-+-+-+-+-+-+-+-+-+-+-+-+-+-+-+-+-+-+-+-+-+-+-+-+-+-+-+
```

Fig. 13

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Type=TBD             |           Length=4            |
+-+-+-+-+-+-+-+-+-+-+-+-+-+-+-+-+-+-+-+-+-+-+-+-+-+-+-+-+-+-+-+-+
|                          Flags                            |T|
+-+-+-+-+-+-+-+-+-+-+-+-+-+-+-+-+-+-+-+-+-+-+-+-+-+-+-+-+-+-+-+-+
```

End-to-end Delay

PATH COMPUTATION METHOD AND APPARATUS, STORAGE MEDIUM, AND ELECTRONIC DEVICE

CROSS-REFERENCE TO RELATED APPLICATION

The present disclosure is a National Stage Filing of PCT International Application No. PCT/CN2022/089969 filed on Apr. 28, 2022, which is based on and claims priority to Chinese Patent Application No. CN202110502498.1, filed on May 8, 2021 and entitled "PATH COMPUTATION METHOD AND APPARATUS, STORAGE MEDIUM, AND ELECTRONIC DEVICE", which is incorporated in its entirety herein by reference.

TECHNICAL FIELD

The embodiments of the present disclosure relate to the field of communication, and in particular to a path computation method and apparatus, a storage medium, and an electronic device.

BACKGROUND

As described in the Request For Comment (RFC) 4655, a Path Computation Element (PCE)-based architecture serves to compute the path of a Multi-Protocol Label Switching (MPLS) and Generalized Multi-Protocol Label Switching (GMPLS) Traffic Engineering (TE) Label Switched Path (LSP). The PCE is an entity (component, application, or network node) that is capable of computing a network path or route based on a network graph and applying computational constraints. In a Path Computation Client (PCC)-initiate mode, a PCC may request the PCE to execute a path computation. In a PCE-initiate mode, the PCE may actively initiate a path computation and send a path establishment request to a head node. Moreover, the PCE, when serving as a controller (a PCE-based Central Controller (PCECC)), may also actively send a path establishment request in which a Central Control Instruction (CCI) object carries path establishment information to all nodes through which the path passes.

In order to satisfy the service requirements of deterministic services, etc., the Institute of Electrical and Electronics Engineers (IEEE) 802.1 defines Time-Sensitive Networking (TSN), which may provide a low delay, a low packet loss rate, high reliability for L2 services. Moreover, in order to implement a deterministic technology on L3, the Internet Engineering Task Force (IETF) also proposes Deterministic Networking (DetNet). As defined in RFC8655, a DetNet-related technical architecture provides deterministic services for a layer 2 bridge and a layer 3 routing network, where the Quality of Service (QoS) requirements of the deterministic services include an upper limit for deterministic delay, a low packet loss rate, a decreased jitter, a high reliability, etc.

A solution to the problem that a network path or route computed based on a network graph cannot satisfy service requirements in the related art has not been provided yet.

SUMMARY

A path computation method and apparatus, a storage medium, and an electronic device are provided in embodiments of the present disclosure, so as to at least solve the problem that a network path or route computed based on a network graph cannot satisfy service requirements in the related art.

A path computation method is provided according to an embodiment of the present disclosure. The method includes:
  computing, by a controller, a forwarding path and forwarding delay information according to an end-to-end delay requirement; and
  sending, by the controller, the forwarding path and the forwarding delay information to a device side.

In an exemplary embodiment, sending, by the controller, the forwarding path and the forwarding delay information to the device side includes:
  sending, by the controller, the forwarding path and the forwarding delay information to the device side through a Path Computation Element Protocol (PCEP), where the controller is a Path Computation Element (PCE).

In an exemplary embodiment, before computing, by the controller, the forwarding path and the forwarding delay information according to the end-to-end delay requirement, the method further includes:
  in a PCE-initiate mode or a PCE-based Central Controller (PCECC) mode, acquiring, by the controller, the end-to-end delay requirement; and
  in a Path Computation Client (PCC)-initiate mode, receiving, by the controller, a path computation request sent by ahead node serving as a PCC.

In an exemplary embodiment, the path computation request is a Path Computation Request (PCReq) message based on a PCEP;
  an extended bit T in a Label Switched Path (LSP)-extended-flag Type Length Value (TLV) of an LSP object is carried in the PCReq message, wherein the extended bit T indicates a time scheduling based path computation request; and
  an extended time-scheduling TLV in a Label Switched Path Attribute (LSPA) object is carried in the PCReq message, wherein the time-scheduling TLV is used for carrying constraints of end-to-end delay, and the constraints comprise a maximum end-to-end delay, a minimum end-to-end delay, and a maximum end-to-end delay variation.

In an exemplary embodiment, sending, by the controller, the forwarding path and the forwarding delay information to the device side includes:
  in a PCC-initiate mode or a PCE-initiate mode, the device side is a head node serving as a PCC, and the controller sends the forwarding path and the forwarding delay information to the head node serving as the PCC; and
  in a PCECC mode, the device side is a node through which the forwarding path passes, and the controller sends the forwarding path and the forwarding delay information to the node through which the forwarding path passes.

In an exemplary embodiment, in a PCC-initiate mode or a PCE-initiate mode, in a case of an Internet Protocol (IP)/Multi-Protocol Label Switching (MPLS) network, the forwarding path and the forwarding delay information are carried in an extended delay field in an Explicit Routing Object (ERO) object;
  in a case of a Segment Routing (SR) network, the forwarding path and the forwarding delay information are carried in an extended delay field in an SR-ERO object; and in a case of a SR version 6 (SRv6) network, the forwarding path and the forwarding delay information are carried in an extended delay field in an SRv6-ERO object.

In an exemplary embodiment, in a PCECC mode, the forwarding path and the forwarding delay information are carried in a time-scheduling TLV newly added to a Central Control Instruction (CCI) object.

In an exemplary embodiment, before computing, by the controller, the forwarding path and the forwarding delay information according to the end-to-end delay requirement, the method further includes:
  performing a negotiation on a time scheduling based path computation capability with the controller serving as a PCE and the device side serving as a PCC.

In an exemplary embodiment, in a PCC-initiate mode or a PCE-initiate mode, in a case of an IP/MPLS network, an extended bit T in an OPEN object of an OPEN message in a PCEP indicates whether the time scheduling based path computation capability is supported;
  in a case of an SR network, an extended bit T in an SR-PCE-capability sub-TLV indicates whether the time scheduling based path computation capability is supported; and
  in a case of an SRv6 network, an extended bit T in an SRv6-PCE-capability sub-TLV indicates whether the time scheduling based path computation capability is supported.

In an exemplary embodiment, in a PCECC mode, an extended bit T in a PCECC capability sub-TLV of an OPEN message indicates whether the time scheduling based path computation capability is supported.

A path computation method is further provided according to another embodiment of the present disclosure. The method includes:
  receiving, by a device side, a forwarding path and forwarding delay information sent by a controller, where the forwarding path and the forwarding delay information are computed by the controller according to an end-to-end delay requirement.

In an exemplary embodiment, before receiving, by the device side, the forwarding path and the forwarding delay information sent by the controller, the method further includes:
  sending, by the device side, a path computation request to the controller through a Path Computation Element Protocol (PCEP), where the controller is a Path Computation Element (PCE).

In an exemplary embodiment, the path computation request is a Path Computation Request (PCReq) message based on the PCEP;
  an extended bit T in a Label Switched Path (LSP)-extended-flag Type Length Value (TLV) of an LSP object is carried in the PCReq message, wherein the extended bit T indicates a time scheduling based path computation request; and
  an extended time-scheduling TLV in a Label Switched Path Attribute (LSPA) object is carried in the PCReq message, wherein the time-scheduling TLV is used for carrying constraints of end-to-end delay, and the constraints comprise a maximum end-to-end delay, a minimum end-to-end delay, and a maximum end-to-end delay variation.

In an exemplary embodiment, in a PCC-initiate mode or a PCE-initiate mode, the device side is a head node serving as a PCC; and
in a PCECC mode, the device side is a node through which the forwarding path passes.

In an exemplary embodiment, in a PCC-initiate mode or a PCE-initiate mode, in a case of an IP/MPLS network, the forwarding path and the forwarding delay information are carried in an extended delay field in an ERO object;
  in a case of an SR network, the forwarding path and the forwarding delay information are carried in an extended delay field in an SR-ERO object; and
  in a case of an SRv6 network, the forwarding path and the forwarding delay information are carried in an extended delay field in an SRv6-ERO object.

In an exemplary embodiment, in a PCECC mode, the forwarding path and the forwarding delay information are carried in a time-scheduling TLV newly added to a Central Control Instruction (CCI) object.

In an exemplary embodiment, before receiving, by the device side, the forwarding path and the forwarding delay information sent by the controller, the method further includes:
  performing a negotiation on a time scheduling based path computation capability with the device side serving as a PCC and the controller serving as a PCE.

In an exemplary embodiment, in a PCC-initiate mode or a PCE-initiate mode, in a case of an IP/MPLS network, an extended bit T in an OPEN object of an OPEN message in a PCEP indicates whether the time scheduling based path computation capability is supported;
  in a case of an SR network, an extended bit T in an SR-PCE-capability sub-TLV in the PCEP indicates whether the time scheduling based path computation capability is supported; and
  in a case of an SRv6 network, an extended bit T in an SRv6-PCE-capability sub-TLV in the PCEP indicates whether the time scheduling based path computation capability is supported.

In an exemplary embodiment, in the PCECC mode, an extended bit T in a PCECC capability sub-TLV of an OPEN message indicates whether the time scheduling based path computation capability is supported.

A path computation apparatus is further provided according to another embodiment of the present disclosure. The apparatus is applied to a controller and includes:
  a computing module, configured to compute a forwarding path and forwarding delay information according to an end-to-end delay requirement; and
  an sending module, configured to send the forwarding path and the forwarding delay information to a device side.

In an exemplary embodiment, the sending module is further configured to
  send the forwarding path and the forwarding delay information to the device side through a PCEP, where the controller is a PCE.

In an exemplary embodiment, the apparatus further includes:
  an acquiring module, configured to, in a PCE-initiate mode or a PCECC mode, acquire the end-to-end delay requirement; and
  a request receiving module, configured to, in a PCC-initiate mode, receive a path computation request sent by a head node serving as a PCC.

In an exemplary embodiment, the path computation request is a PCReq message based on the PCEP;

an extended bit T in an LSP-extended-flag TLV of an LSP object is carried in the PCReq message, wherein the extended bit T indicates a time scheduling based path computation request; and an extended time-scheduling TLV in an LSPA object is carried in the PCReq message, wherein the time-scheduling TLV is used for carrying constraints of end-to-end delay, and the constraints include a maximum end-to-end delay, a minimum end-to-end delay, and a maximum end-to-end delay variation.

In an exemplary embodiment, the sending module is further configured to, in a PCC-initiate mode or the PCE-initiate mode with the device side being a head node that serves as a PCC, send the forwarding path and the forwarding delay information to the head node serving as the PCC, and the sending module is further configured to, in a PCECC mode with the device side being a node through which the forwarding path passes, send the forwarding path and the forwarding delay information to the node through which the forwarding path passes.

In an exemplary embodiment, in a PCC-initiate mode or a PCE-initiate mode, in a case of an IP/MPLS network, the forwarding path and the forwarding delay information are carried in an extended delay field in an ERO object;

in a case of an SR network, the forwarding path and the forwarding delay information are carried in an extended delay field in an SR-ERO object; and in a case of an SRv6 network, the forwarding path and the forwarding delay information are carried in an extended delay field in an SRv6-ERO object.

In an exemplary embodiment, in a PCECC mode, the forwarding path and the forwarding delay information are carried in a time-scheduling TLV newly added to a CCI object.

In an exemplary embodiment, the apparatus further includes:

a first negotiating module, configured to serve as a PCE to perform a negotiation on a time scheduling based path computation capability with the device side which serves as a PCC.

In an exemplary embodiment, in a PCC-initiate mode or a PCE-initiate mode, in a case of an IP/MPLS network, an extended bit T in an OPEN object of an OPEN message in a PCEP indicates whether the time scheduling based path computation capability is supported;

in a case of an SR network, an extended bit T in an SR-PCE-capability sub-TLV indicates whether the time scheduling based path computation capability is supported; and in a case of an SRv6 network, an extended bit T in an SRv6-PCE-capability sub-TLV indicates whether the time scheduling based path computation capability is supported.

In an exemplary embodiment, in a PCECC mode, an extended bit T in a PCECC capability sub-TLV of an OPEN message indicates whether the time scheduling based path computation capability is supported.

A path computation apparatus is further provided according to another embodiment of the present disclosure. The apparatus is applied to a device side and includes:

a receiving module, configured to receive a forwarding path and forwarding delay information sent by a controller, where the forwarding path and the forwarding delay information are computed by the controller according to an end-to-end delay requirement.

In an exemplary embodiment, the apparatus further includes:

a sending module, configured to send a path computation request to the controller through a PCEP, where the controller is a PCE.

In an exemplary embodiment, the path computation request is a PCReq message based on the PCEP;

an extended bit T in an LSP-extended-flag TLV of an LSP object is carried in the PCReq message, wherein the extended bit T indicates a time scheduling based path computation request; and an extended time-scheduling TLV in an LSPA object is carried in the PCReq message, wherein the time-scheduling TLV is used for carrying constraints of end-to-end delay, and the constraints include a maximum end-to-end delay, a minimum end-to-end delay, and a maximum end-to-end delay variation.

In an exemplary embodiment, in a PCC-initiate mode or a PCE-initiate mode, the device side is a head node serving as a PCC; and in a PCECC mode, the device side is a node through which the forwarding path passes.

In an exemplary embodiment, in a PCC-initiate mode or a PCE-initiate mode, in a case of an IP/MPLS network, the forwarding path and the forwarding delay information are carried in an extended delay field in an ERO object;

in a case of an SR network, the forwarding path and the forwarding delay information are carried in an extended delay field in an SR-ERO object; and in a case of an SRv6 network, the forwarding path and the forwarding delay information are carried in an extended delay field in an SRv6-ERO object.

In an exemplary embodiment, in a PCECC mode, the forwarding path and the forwarding delay information are carried in a time-scheduling TLV newly added to a CCI object.

In an exemplary embodiment, the apparatus further includes:

a second negotiating module, configured to serve as a PCC to perform a negotiation on a time scheduling based path computation capability with the controller which serves as a PCE.

In an exemplary embodiment, in a PCC-initiate mode or a PCE-initiate mode, in a case of an IP/MPLS network, an extended bit T in an OPEN object of an OPEN message in a PCEP indicates whether the time scheduling based path computation capability is supported;

in a case of an SR network, an extended bit T in an SR-PCE-capability sub-TLV in the PCEP indicates whether the time scheduling based path computation capability is supported; and in a case of an SRv6 network, an extended bit T in an SRv6-PCE-capability sub-TLV in the PCEP indicates whether the time scheduling based path computation capability is supported.

In an exemplary embodiment, in a PCECC mode, an extended bit T in a PCECC capability sub-TLV of an OPEN message indicates whether the time scheduling based path computation capability is supported.

A computer-readable storage medium is further provided in yet another embodiment of the present disclosure. The storage medium stores a computer program, where the computer program, when running on a processor, causes the processor to execute operations of any one of the above method embodiments.

An electronic device is further provided in still another embodiment of the present disclosure. The electronic device includes a memory and a processor, where the memory stores a computer program, and the processor is configured to execute operations of any one of the above method embodiments when running the computer program.

In the embodiments of the present disclosure, the controller computes the forwarding path and the forwarding delay information according to the end-to-end delay requirement; and the controller sends the forwarding path and the forwarding delay information to the device side. Accordingly, the problem that a network path or route computed based on a network graph cannot satisfy service requirements in the related art can be solved, and a determined target path can satisfy the service requirements.

BRIEF DESCRIPTION OF THE DRAWINGS

FIG. 1 is a structural block diagram of hardware of a mobile terminal of a path computation method according to an embodiment of the present disclosure;

FIG. 2 is a first flowchart of a path computation method according to an embodiment of the present disclosure;

FIG. 3 is a second flowchart of a path computation method according to an embodiment of the present disclosure;

FIG. 4 is a schematic diagram of an extended format of a bit T in an LSP-extended-flag TLV according to an embodiment of the present disclosure;

FIG. 5 is a schematic diagram of an extended format of a time-scheduling TLV in an LSPA according to an embodiment of the present disclosure;

FIG. 6 is a schematic diagram of an extended format of a bit T in an OPEN object according to an embodiment of the present disclosure;

FIG. 7 is a schematic diagram of an extended format of time scheduling information in an Internet protocol version 4 (IPv4) ERO object according to an embodiment of the present disclosure;

FIG. 8 is a schematic diagram of an extended format of time scheduling information in an IPv6 ERO object according to an embodiment of the present disclosure;

FIG. 9 is a schematic diagram of an extended format of a bit T in an SR-PCE-capability sub-TLV according to an embodiment of the present disclosure;

FIG. 10 is a schematic diagram of an extended format of time scheduling information in an SR-ERO object according to an embodiment of the present disclosure;

FIG. 11 is a schematic diagram of an extended format of a bit T in an SRv6-PCE-capability sub-TLV according to an embodiment of the present disclosure;

FIG. 12 is a schematic diagram of an extended format of a bit T in an SRv6-PCE-capability sub-TLV according to an embodiment of the present disclosure;

FIG. 13 is a schematic diagram of an extended format of a bit T in a PCECC-capability sub-TLV according to an embodiment of the present disclosure;

DETAILED DESCRIPTION

Figure 14:
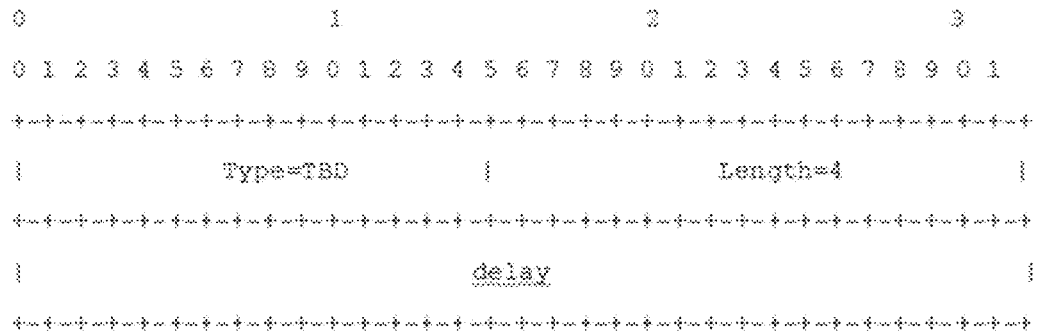
FIG. 14 is a schematic diagram of a time-scheduling TLV format according to an embodiment of the present disclosure.

The embodiments of the present disclosure will be described in detail below in conjunction with the accompanying drawings and the embodiments.

It is to be noted that the terms "first", "second", etc. in the description and claims of the present disclosure and the above accompanying drawings are used for distinguishing between similar objects, instead of necessarily describing a particular sequence or a successive order.

The method embodiments provided in the embodiments of the present disclosure may be executed in a mobile terminal, a computer terminal, or a similar computation apparatus. With running on a mobile terminal as an example, FIG. 1 is a structural block diagram of hardware of a mobile terminal of a path computation method according to an embodiment of the present disclosure. As shown in FIG. 1, the mobile terminal may include one or more processors 102 (only one processor is shown in FIG. 1) and a memory 104 configured to store data. The processors 102 may include, but are not limited to, processing apparatuses such as a microcontroller unit (MCU) or a field-programmable gate array (FPGA). The above mobile terminal may further include a transmission device 106 configured to play a role in communication and an input/output device 108. Those of ordinary skill in the art can understand that the structure shown in FIG. 1 is merely schematic and does not limit the structure of the above mobile terminal. For example, the mobile terminal may further include more or fewer assemblies than that shown in FIG. 1, or have a configuration differing from that shown in FIG. 1.

The memory 104 may be configured to store a computer program, for example, a software program and modules of application software, such as a computer program corresponding to the path computation method in the embodiments of the present disclosure. The processor 102 runs the computer program stored in the memory 104 to execute various function applications and service chain address pool slicing processing, that is, to realize the above method. The memory 104 may include a high-speed random access memory, and may also include a non-volatile memory, such as one or more magnetic storage apparatuses, flashes, or other non-volatile solid-state memories. In some instances, the memory 104 may further include memories remotely configured relative to the processor 102. These remote memories may be connected to the mobile terminal through a network. The instances of the above network include, but are not limited to, the Internet, an intranet, a local area network, a mobile communication network, and their combinations.

The transmission apparatus 106 is configured to receive or send data via one network. The specific instances of the above network may include a wireless network provided by a communication provider of the mobile terminal. In an instance, the transmission apparatus 106 includes a Network Interface Controller (NIC) that may be connected to other network devices through a base station to communicate with the Internet. In an instance, the transmission apparatus 106 may be a Radio Frequency (RF) module, which is configured to communicate with the Internet wirelessly.

The path computation method running on the above mobile terminal or network architecture is provided in the embodiment. FIG. 2 is a first flowchart of a path computation method according to an embodiment of the present disclosure. As shown in FIG. 2, the flow includes operations S202 and S204.

At S202, a controller computes a forwarding path and forwarding delay information according to an end-to-end delay requirement.

At S204, the controller sends the forwarding path and the forwarding delay information to a device side.

In an exemplary embodiment, in the above operation S204, the forwarding path and the forwarding delay information may be sent to the device side through a Path Computation Element Protocol (PCEP). The controller is a Path Computation Element (PCE).

Through the above operations S202-S204, the controller computes the forwarding path and the forwarding delay information according to the end-to-end delay requirement; and the controller sends the forwarding path and the forwarding delay information to the device side. Accordingly, the problem that a network path or route computed based on a network graph cannot satisfy service requirements in the related art can be solved, and a determined target path can satisfy the service requirements.

In an exemplary embodiment, before the controller computes the forwarding path and the forwarding delay information according to the end-to-end delay requirement, in a PCE-initiate mode or a PCE-based Central Controller (PCECC) mode, the controller acquires the end-to-end delay requirement; and in a Path Computation Client (PCC)-initiate mode, the controller receives a path computation request sent by a head node serving as a PCC.

In an exemplary embodiment, the path computation request is a Path Computation Request (PCReq) message based on the PCEP. An extended bit T in a Label Switched Path (LSP)-extended-flag Type Length Value (TLV) of an LSP object is carried in the PCReq message, wherein the extended bit T indicates a time scheduling based path computation request. An extended time-scheduling TLV in a Label Switched Path Attribute (LSPA) object is carried in the PCReq message, wherein the time-scheduling TLV is used for carrying constraints of end-to-end delay. The constraints include a maximum end-to-end delay, a minimum end-to-end delay, and a maximum end-to-end delay variation.

In an exemplary embodiment, the above operation S204 may be implemented as follows.

In a PCC-initiate mode or a PCE-initiate mode, the device side is a head node serving as a PCC, and the controller sends the forwarding path and the forwarding delay information to the head node serving as the PCC.

In a PCECC mode, the device side is a node through which the forwarding path passes, and the controller sends the forwarding path and the forwarding delay information to the node through which the forwarding path passes.

In the embodiment, in a PCC-initiate mode or a PCE-initiate mode, in a case of an Internet Protocol (IP)/Multi-Protocol Label Switching (MPLS) network, the forwarding path and the forwarding delay information are carried in an extended delay field in an Explicit Routing Object (ERO) object; in a case of a Segment Routing (SR) network, the forwarding path and the forwarding delay information are carried in an extended delay field in an SR-ERO object; and in a case of an SR version 6 (SRv6) network, the forwarding path and the forwarding delay information are carried in an extended delay field in an SRv6-ERO object.

In the embodiment, in a PCECC mode, the forwarding path and the forwarding delay information are carried in a time-scheduling TLV newly added to a Central Control Instruction (CCI) object.

In another exemplary embodiment, before the controller computes the forwarding path and the forwarding delay information according to the end-to-end delay requirement, a negotiation on a time scheduling based path computation capability is performed with the controller serving as a PCE and the device side serving as a PCC.

In the embodiment, in a PCC-initiate mode or a PCE-initiate mode, in a case of an IP/MPLS network, an extended bit T in an OPEN object of an OPEN message in the PCEP indicates whether the time scheduling based path computation capability is supported; in a case of an SR network, an extended bit T in an SR-PCE-capability sub-TLV indicates whether the time scheduling based path computation capability is supported; and in a case of an SRv6 network, an extended bit T in an SRv6-PCE-capability sub-TLV indicates whether the time scheduling based path computation capability is supported.

In the embodiment, in a PCECC mode, an extended bit T in a PCECC capability sub-TLV of an OPEN message indicates whether the time scheduling based path computation capability is supported.

A path computation method is further provided according to another embodiment of the present disclosure. FIG. 3 is a second flowchart of a path computation method according to an embodiment of the present disclosure. As shown in FIG. 3, the flow includes an operation S302.

At S302, a device side receives a forwarding path and forwarding delay information sent by a controller, where the forwarding path and the forwarding delay information are calculated by the controller according to an end-to-end delay requirement.

In the above operation S302, the forwarding path and the forwarding delay information sent by the controller may be received through a PCEP.

Through the above operation S302, the problem that a network path or route computed based on a network graph cannot satisfy service requirements in the related art can be solved, and a determined target path can satisfy the service requirements.

In an exemplary embodiment, before the device side receives the forwarding path and the forwarding delay information sent by the controller, the device side sends a path computation request to the controller through a PCEP, where the controller is a PCE.

In the embodiment, the path computation request is a PCReq message based on the PCEP. An extended bit T in a Label Switched Path (LSP)-extended-flag TLV of an LSP object is carried in the PCReq message, wherein the extended bit T indicates a time scheduling based path computation request. An extended time-scheduling TLV in an LSPA object is carried in the PCReq message, wherein the time-scheduling TLV is used for carrying constraints of end-to-end delay. The constraints include a maximum end-to-end delay, a minimum end-to-end delay, and a maximum end-to-end delay variation.

In the embodiment, in a PCC-initiate mode or a PCE-initiate mode, the device side is a head node serving as a PCC; and in a PCECC mode, the device side is a node through which the forwarding path passes.

In the embodiment, in a PCC-initiate mode or a PCE-initiate mode, in a case of an IP/MPLS network, the forwarding path and the forwarding delay information are carried in an extended delay field in an ERO object; in a case of an SR network, the forwarding path and the forwarding delay information are carried in an extended delay field in an SR-ERO object; and in a case of an SRv6 network, the forwarding path and the forwarding delay information are carried in an extended delay field in an SRv6-ERO object.

In the embodiment, in a PCECC mode, the forwarding path and the forwarding delay information are carried in a time-scheduling TLV newly added to a CCI object.

In another exemplary embodiment, before the device side receives the forwarding path and the forwarding delay information sent by the controller, a negotiation on a time scheduling based path computation capability is performed with the device side serving as a PCC and the controller serving as a PCE.

In the embodiment, in a PCC-initiate mode or a PCE-initiate mode, in a case of an IP/MPLS network, an extended bit T in an OPEN object of an OPEN message in the PCEP indicates whether the time scheduling based path computation capability is supported; in a case of an SR network, an extended bit T in an SR-PCE-capability sub-TLV in the PCEP indicates whether the time scheduling based path computation capability is supported; and in a case of an SRv6 network, an extended bit T in an SRv6-PCE-capability sub-TLV in the PCEP indicates whether the time scheduling based path computation capability is supported.

In the embodiment, in a PCECC mode, an extended bit T in a PCECC capability sub-TLV of an OPEN message indicates whether the time scheduling based path computation capability is supported.

The PCE may be applied to compute end-to-end delay queue scheduling. A time scheduling based path computation may be achieved by extending the PCEP. The embodiments of the present disclosure provide a time queue scheduling based computation method. Path computation information may be exchanged between a device and a controller (such as a PCE) by extending the PCEP. The method is applicable to IP/MPLS, SR, and SRv6 networks. The path computation interaction may be implemented in various ways. In a first case of a PCC-initiate mode, a head node may serve as a PCC and may actively initiate a time scheduling based path computation request to the PCE or the controller, and the PCE or the controller computes a path and then sends a response message to the head node. In a second case of a PCE-initiate mode or a PCECC mode, the PCE or the controller may actively compute a time scheduling based path. In the PCE-initiate mode, the PCE or the controller sends a path result to a head node. In the PCECC mode, the PCE or the controller sends a path result to all nodes through which the path passes.

In the PCC-initiate mode, firstly, the head node sends a path computation request to the PCE or the controller, so as to apply for computation of a path satisfying end-to-end delay.

FIG. 4 is a schematic diagram of an extended format of a bit T in an LSP-extended-flag TLV according to an embodiment of the present disclosure. As shown in FIG. 4, a Path Computation Request (PCReq) message of a PCEP is extended, an LSP-extended-flag in an LSP object is extended to provide a new extended flag for indicating a time scheduling based path computation request.

FIG. 5 is a schematic diagram of an extended format of a time-scheduling TLV in an LSPA according to an embodiment of the present disclosure. As shown in FIG. 5, time based constraints in the PCEP are extended, and a new TLV is extended in the LSPA object to carry time scheduling based path computation constraints, including a maximum end-to-end delay, a minimum end-to-end delay, a delay jitter, etc.

In the PCC-initiate mode, the PCE computes the path result and a delay of each node according to delay information, including extensions of path computation results of the IP/MPLS, SR, and SRv6 networks, etc., and sends the path result and the delay of each node to the PCC.

In a case of the IP/MPLS network, the PCEP is extended to achieve negotiation on a time scheduling based path computation capability. FIG. 6 is a schematic diagram of an extended format of a bit T in an OPEN object according to an embodiment of the present disclosure. As shown in FIG. 6, the OPEN object of an OPEN message is extended to carry a bit T. FIG. 7 is a schematic diagram of an extended format of time scheduling information in an IPv4 ERO object according to an embodiment of the present disclosure. FIG. 8 is a schematic diagram of an extended format of time scheduling information in an IPv6 ERO object according to an embodiment of the present disclosure. The extension of the sending of the path computation result in the PCEP is as shown in FIGS. 7 and 8.

In a case of the SR network, the PCEP is extended to achieve the negotiation on a time scheduling based path computation capability. FIG. 9 is a schematic diagram of an extended format of a bit T in an SR-PCE-capability sub-TLV according to an embodiment of the present disclosure. As shown in FIG. 9, an OPEN object of an extended OPEN message is extended to carry a bit T. FIG. 10 is a schematic diagram of an extended format of time scheduling information in an SR-ERO object according to an embodiment of the present disclosure. The extension of the sending of an SR-Traffic Engineering (TE) based path computation result in the PCEP is as shown in FIG. 10.

In a case of the SRv6 network, the PCEP is extended to achieve the negotiation on a time scheduling based path computation capability. FIG. 11 is a schematic diagram of an extended format of a bit T in an SRv6-PCE-capability sub-TLV according to an embodiment of the present disclosure. FIG. 12 is a schematic diagram of an extended format of a bit T in an SRv6-PCE-capability sub-TLV according to an embodiment of the present disclosure. The extension of a bit T in an OPEN object of an extended OPEN message is as shown in FIG. 11. The extension of the sending of a path computation result in the PCEP is as shown in FIG. 12.

In the PCE-initiate mode, the PCE or the controller may actively compute a time scheduling based path and send a path result to the head node. The extension of the path result is the same as that in the PCC-initiate mode. The extensions of the path result in the PCEP for the IP/MPLS, SR, and SRv6 networks are as shown in FIGS. 7, 8, 10, and 12.

In the PCECC mode, the PCE or the controller may actively compute a time scheduling based path and send a path result to all nodes through which the path passes. An extended bit T in a PCECC capability sub-TLV in the OPEN message is used for negotiating on supporting of a delay scheduling based capability. A time-scheduling TLV added to a CCI object of a PCECC is used for sending the path computation result. The extension is applicable to the IP/MPLS, SR, and SRv6 networks.

FIG. 13 is a schematic diagram of an extended format of a bit T in a PCECC-capability sub-TLV according to an embodiment of the present disclosure. As shown in FIG. 13, in the PCECC mode, an extended bit T in the PCECC capability sub-TLV of the OPEN message of the PCEP indicates whether a time scheduling based path computation capability is supported.

FIG. 14 is a schematic diagram of a time-scheduling TLV format according to an embodiment of the present disclosure. As shown in FIG. 14, in the PCECC mode, the target path and the delay information of each node are carried in a time-scheduling TLV newly added to the CCI object of the PCECC.

The related time scheduling based information in the path result, such as an extended delay, etc., is not limited to a specific delay, and may further include a delay, a queue, scheduling, etc.

In the embodiment, the interaction of the path computation information between the device and the controller (such as the PCE) is realized by extending the PCEP. The method is applicable to the IP/MPLS, SR, and SRv6 networks. In the PCC-initiate mode, the method may include the following operations.

A head node, serving as a PCC, sends a request message to a controller or a PCE to request for a computation of a path satisfying end-to-end delay, where the request message carries related constraints such as a delay queue.

The controller or the PCE computes a path result and a delay of each node according to the delay information, including the extensions of the path computation results for the IP/MPLS, SR, and SRv6 networks, etc., and sends a response message to the PCC.

In the PCE-initiate mode and the PCECC mode, the method includes the following operations.

A PCE or a controller actively computes a time scheduling based path satisfying end-to-end delay.

The PCE or the controller sends a time scheduling information based path result to a device side.

Figure 15:
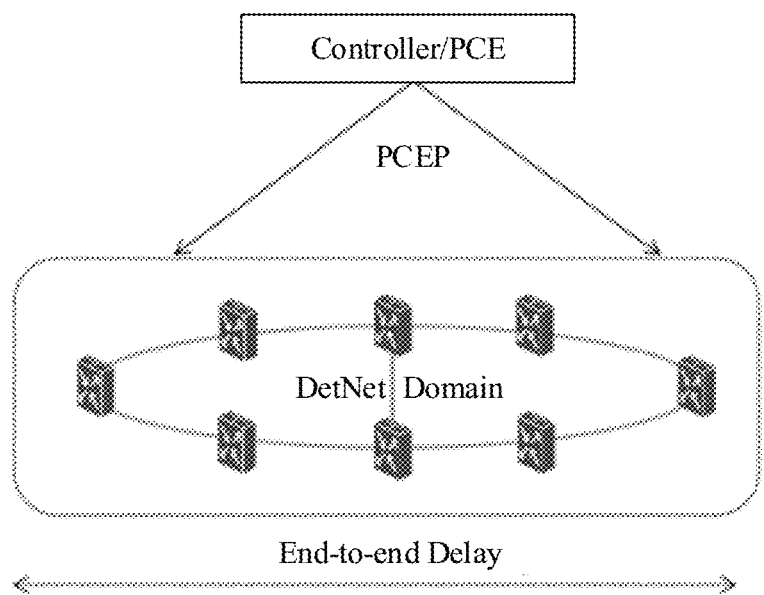
FIG. 15 is a structural diagram of Deterministic Networking (DetNet) computed based on a time scheduling path according to an embodiment of the present disclosure.

FIG. 15 is a structural diagram of Deterministic Networking (DetNet) computed based on a time scheduling path according to an embodiment of the present disclosure. As shown in FIG. 15, in a DetNet IP/MPLS network, a controller (such as a PCE) interacts with the DetNet through the PCEP, and a path result satisfying the end-to-end delay and including a forwarding path and time scheduling information is required to be computed. The embodiment of the present disclosure provides a time queue scheduling based computation method. The interaction of path computation information between a device and a controller (such as a PCE) is realized by extending the PCEP. When a DetNet domain is an IP/MPLS network, a flow in a PCC-initiate mode is as follows.

A head node, serving as a PCC, sends a request message to a controller or a PCE to request for a computation of a path satisfying end-to-end delay, where a bit T in an LSP_extended_LSP in the request message is set to 1, and related constraints such as a delay queue are carried in a time-scheduling TLV in an LSPA object.

The controller or the PCE computes a path forwarding result and delay information of each node according to delay information, carries the path forwarding result and the delay information of each node in an ERO object, and sends a response message to the PCC.

In a DetNet SR network, a controller (such as a PCE) interacts with the DetNet through the PCEP, and a path result satisfying the end-to-end delay and including a forwarding path and time scheduling information is required to be computed. The interaction of path computation information between the device and the controller (such as the PCE) is realized by extending the PCEP When a DetNet domain is an SR network, a flow in the PCC-initiate mode is as follows.

A head node, serving as a PCC, sends a request message to a controller or a PCE to request for a computation of a path satisfying end-to-end delay, where a bit T in an LSP_extended_LSP in the request message is set to 1, and related constraints such as a delay queue are carried in a time-scheduling TLV in an LSPA object.

The controller or the PCE computes a path forwarding result and delay information of each node according to delay information, carries the path forwarding result and the delay information of each node in an SR-ERO object, and sends a response message to the PCC.

In a DetNet SRv6 network, a controller (such as a PCE) interacts with the DetNet through the PCEP, and a path result satisfying the end-to-end delay and including a forwarding path and time scheduling information is required to be computed. In the embodiment, the interaction of path computation information between the device and the controller (such as the PCE) is realized by extending the PCEP. When a DetNet domain is an SRv6 network, a flow in the PCC-initiate mode is as follows.

A head node, serving as a PCC, sends a request message to a controller or a PCE to request for a computation of a path satisfying end-to-end delay, where a bit T in an LSP_extended_LSP in the request message is set to 1, and related constraints such as a delay queue are carried in a time-scheduling TLV in an LSPA object.

The controller or the PCE computes a path forwarding result and delay information of each node according to the delay information, carries the path forwarding result and the delay information of each node in an SRv6-ERO object, and sends a response message to the PCC.

In the embodiment, the interaction of the path computation information between the device and the controller (such as the PCE) is realized by extending the PCEP. The method is applicable to the IP/MPLS, SR, and SRv6 networks. The device side applies to the controller (such as the PCE) for time scheduling based path computation. The PCE computes the forwarding path and the delay of each node according to the delay information, and sends the forwarding path satisfying the end-to-end delay and scheduling information by extending the PCEP.

Figure 16:
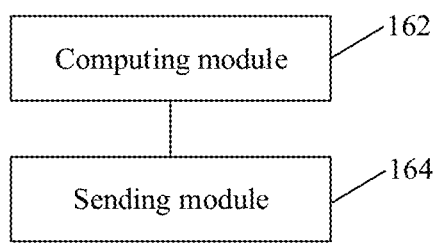
FIG. 16 is a first block diagram of a path computation apparatus according to an embodiment of the present disclosure.

A path computation apparatus is further provided according to another embodiment of the present disclosure. The apparatus is applied to a controller. FIG. 16 is a first block diagram of a path computation apparatus according to an embodiment of the present disclosure. As shown in FIG. 16, the apparatus includes:
- a computing module 162, configured to compute a forwarding path and forwarding delay information according to an end-to-end delay requirement; and
- an sending module 164, configured to send the forwarding path and the forwarding delay information to a device side.

In an exemplary embodiment, the sending module 164 is further configured to:
- send the forwarding path and the forwarding delay information to the device side through a PCEP, where the controller is a PCE.

In an exemplary embodiment, the apparatus further includes:
- an acquiring module, configured to, in a PCE-initiate mode or a PCECC mode, acquire the end-to-end delay requirement; and
- a request receiving module, configured to, in a PCC-initiate mode, receive a path computation request sent by a head node serving as a PCC.

In an exemplary embodiment, the path computation request is a PCReq message based on the PCEP;

an extended bit T in an LSP-extended-flag TLV of an LSP object is carried in the PCReq message, wherein the extended bit T indicates a time scheduling based path computation request; and an extended time-scheduling TLV in an LSPA object is carried in the PCReq message, wherein the time-scheduling TLV is used for carrying constraints of end-to-end delay, and the constraints include a maximum end-to-end delay, a minimum end-to-end delay, and a maximum end-to-end delay variation.

In an exemplary embodiment, the sending module 164 is further configured to, in a PCC-initiate mode or a PCE-initiate mode with the device side being a head node that serves as a PCC, send the forwarding path and the forwarding delay information to the head node serving as the PCC, and the sending module is further configured to, in the PCECC mode with the device side being a node through which the forwarding path passes, send the forwarding path and the forwarding delay information to the node through which the forwarding path passes.

In an exemplary embodiment, in a PCC-initiate mode or a PCE-initiate mode, in a case of an IP/MPLS network, the forwarding path and the forwarding delay information are carried in an extended delay field in an ERO object;

in a case of an SR network, the forwarding path and the forwarding delay information are carried in an extended delay field in an SR-ERO object; and in a case of an SRv6 network, the forwarding path and the forwarding delay information are carried in an extended delay field in an SRv6-ERO object.

In an exemplary embodiment, in a PCECC mode, the forwarding path and the forwarding delay information are carried in a time-scheduling TLV newly added to a CCI object.

In an exemplary embodiment, the apparatus further includes:

a first negotiating module, configured to serve as a PCE to perform a negotiation on a time scheduling based path computation capability with the device side which serves as a PCC.

In an exemplary embodiment, in a PCC-initiate mode or a PCE-initiate mode, in a case of an IP/MPLS network, an extended bit T in an OPEN object of an OPEN message in the PCEP indicates whether the time scheduling based path computation capability is supported;

in a case of an SR network, an extended bit T in an SR-PCE-capability sub-TLV indicates whether the time scheduling based path computation capability is supported; and in a case of an SRv6 network, an extended bit T in an SRv6-PCE-capability sub-TLV indicates whether the time scheduling based path computation capability is supported.

In an exemplary embodiment, in the PCECC mode, an extended bit T in a PCECC capability sub-TLV of an OPEN message indicates whether the time scheduling based path computation capability is supported.

Figure 17:
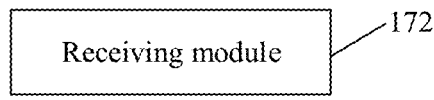
FIG. 17 is a second block diagram of a path computation apparatus according to an embodiment of the present disclosure.

A path computation apparatus is further provided according to another embodiment of the present disclosure. The apparatus is applied to a device side. FIG. 17 is a second block diagram of a path computation apparatus according to an embodiment of the present disclosure. As shown in FIG. 17, the apparatus includes:

a receiving module 172, configured to receive a forwarding path and forwarding delay information sent by a controller, where the forwarding path and the forwarding delay information are computed by the controller according to an end-to-end delay requirement.

In an exemplary embodiment, the apparatus further includes:

a sending module, configured to send a path computation request to the controller through a PCEP, where the controller is a PCE.

In an exemplary embodiment, the path computation request is a PCReq message based on the PCEP;

an extended bit T in an LSP-extended-flag TLV of an LSP object is carried in the PCReq message, wherein the extended bit T indicates a time scheduling based path computation request; and an extended time-scheduling TLV in an LSPA object is carried in the PCReq message, wherein the time-scheduling TLV is used for carrying constraints of end-to-end delay, and the constraints include a maximum end-to-end delay, a minimum end-to-end delay, and a maximum end-to-end delay variation.

In an exemplary embodiment, in a PCC-initiate mode or a PCE-initiate mode, the device side is a head node serving as a PCC; and in a PCECC mode, the device side is a node through which the forwarding path passes.

In an exemplary embodiment, in a PCC-initiate mode or a PCE-initiate mode, in a case of an IP/MPLS network, the forwarding path and the forwarding delay information are carried in an extended delay field in an ERO object;

in a case of an SR network, the forwarding path and the forwarding delay information are carried in an extended delay field in an SR-ERO object; and in a case of an SRv6 network, the forwarding path and the forwarding delay information are carried in an extended delay field in an SRv6-ERO object.

In an exemplary embodiment, in a PCECC mode, the forwarding path and the forwarding delay information are carried in a time-scheduling TLV newly added to a CCI object.

In an exemplary embodiment, the apparatus further includes:

a second negotiating module, configured to serve as a PCC to perform a negotiation on a time scheduling based path computation capability with the controller which serves as a PCE.

In an exemplary embodiment, in a PCC-initiate mode or a PCE-initiate mode, in a case of an IP/MPLS network, an extended bit T in an OPEN object of an OPEN message in a PCEP indicates whether the time scheduling based path computation capability is supported;

in a case of an SR network, an extended bit T in an SR-PCE-capability sub-TLV in the PCEP indicates whether the time scheduling based path computation capability is supported; and in a case of an SRv6 network, an extended bit T in an SRv6-PCE-capability sub-TLV in the PCEP indicates whether the time scheduling based path computation capability is supported.

In an exemplary embodiment, in a PCECC mode, an extended bit T in a PCECC capability sub-TLV of an OPEN message indicates whether the time scheduling based path computation capability is supported.

A computer-readable storage medium is further provided in an embodiment of the present disclosure. The computer-readable storage medium stores a computer program, where the computer program, when running on a processor, causes the processor to execute operations of any one of the above method embodiments.

In an exemplary embodiment, the above computer-readable storage media may include, but are not limit to, various media capable of storing a computer program, such as a Universal Serial Bus (USB) flash disk, a Read-Only Memory (ROM), a Random Access Memory (RAM), a mobile hard disk, a magnetic disk or an optical disk, etc.

An electronic device is further provided in an embodiment of the present disclosure. The electronic device includes a memory and a processor, where the memory stores a computer program, and the processor is configured to execute operations of any one of the above method embodiments when running the computer program.

In an exemplary embodiment, the above electronic device may further include a transmission device and an input/output device, where the transmission device and the input/output device are connected to the above processor.

For the specific instances in the embodiments, reference may be made to the instances described in the above embodiments and the exemplary embodiments, which will not be repeated in the embodiment.

Apparently, those having ordinary skill in the art should understand that all the above modules or operations of the present disclosure may be implemented through a general-purpose computation apparatus, centralized on a single computation apparatus or distributed over a network composed of a plurality of computation apparatuses, and implemented through a program code executable by the computation apparatus. Therefore, the above modules or operations may be stored in a storage apparatus to be executed by the computation apparatus. In certain cases, the operations shown or described may be executed in a different order from herein. Alternatively, some or all of the modules or operations may be implemented by fabricating same into individual integrated circuit modules separately. In this way, the present disclosure is not limited to any particular combination of hardware and software.

What are described above are merely the exemplary embodiments of the present disclosure, but are not intended to limit the present disclosure. Those having ordinary skill in the art can make various modifications and variations to the present disclosure. Any modifications, equivalent replacements, improvements, etc. made within the principles of the present disclosure should fall within the scope of protection defined by the appended set of claims of the present disclosure.

What is claimed is:

1. A path computation method, comprising:
computing, by a controller, a forwarding path and forwarding delay information according to an end-to-end delay requirement; and
sending, by the controller, the forwarding path and the forwarding delay information to a device side;
wherein before computing, by the controller, the forwarding path and the forwarding delay information according to the end-to-end delay requirement, the method further comprises: performing a negotiation on a time scheduling based path computation capability with the controller serving as a Path Computation Element (PCE) and the device side serving as a Path Computation Client (PCC);
wherein,
in a PCC-initiate mode or a PCE-initiate mode, in a case of an Internet Protocol (IP)/Multi-Protocol Label Switching (MPLS) network, an extended bit T in an OPEN object of an OPEN message in a Path Computation Element Protocol (PCEP) indicates whether the time scheduling based path computation capability is supported; in a case of a Segment Routing (SR) network, an extended bit T in an SR-PCE-capability sub-TLV indicates whether the time scheduling based path computation capability is supported; and in a case of an SRv6 network, an extended bit T in an SRv6-PCE-capability sub-TLV indicates whether the time scheduling based path computation capability is supported;
or,
in a PCE-based Central Controller (PCECC) mode, an extended bit T in a PCECC capability sub-TLV of an OPEN message indicates whether the time scheduling based path computation capability is supported.

2. The method according to claim 1, wherein sending, by the controller, the forwarding path and the forwarding delay information to the device side comprises:
sending, by the controller, the forwarding path and the forwarding delay information to the device side through a Path Computation Element Protocol (PCEP), wherein the controller is the PCE.

3. The method according to claim 1, wherein before computing, by the controller, the forwarding path and the forwarding delay information according to the end-to-end delay requirement, the method further comprises:
in the PCE-initiate mode or the PCECC mode, acquiring, by the controller, the end-to-end delay requirement; and
in the PCC initiate mode, receiving, by the controller, a path computation request sent by a head node serving as a PCC.

4. The method according to claim 3, wherein
the path computation request is a Path Computation Request (PCReq) message based on a Path Computation Element Protocol (PCEP);
an extended bit T in a Label Switched Path (LSP)-extended-flag Type Length Value (TLV) of an LSP object is carried in the PCReq message, wherein the extended bit T indicates the time scheduling based path computation request; and
an extended time-scheduling TLV in a Label Switched Path Attribute (LSPA) object is carried in the PCReq message, wherein the time-scheduling TLV is used for carrying constraints of end-to-end delay, and the constraints comprise a maximum end-to-end delay, a minimum end-to-end delay, and a maximum end-to-end delay variation.

5. The method according to claim 1, wherein sending, by the controller, the forwarding path and the forwarding delay information to the device side comprises:
in a PCC-initiate mode or a PCE-initiate mode, the device side is a head node serving as a PCC, and the controller sends the forwarding path and the forwarding delay information to the head node serving as the PCC; and
in a PCECC mode, the device side is a node through which the forwarding path passes, and the controller sends the forwarding path and the forwarding delay information to the node through which the forwarding path passes.

6. The method according to claim 1, wherein
in a PCC-initiate mode or a PCE-initiate mode, in a case of an Internet Protocol (IP)/Multi-Protocol Label Switching (MPLS) network, the forwarding path and the forwarding delay information are carried in an extended delay field in an Explicit Routing Object (ERO) object; in a case of a Segment Routing (SR) network, the forwarding path and the forwarding delay information are carried in an extended delay field in an SR-ERO object; and in a case of an SR version 6

(SRv6) network, the forwarding path and the forwarding delay information are carried in an extended delay field in an SRv6-ERO object;

or, in a PCECC mode, the forwarding path and the forwarding delay information are carried in a time-scheduling TLV newly added to a Central Control Instruction (CCI) object.

7. A path computation method, comprising:

receiving, by a device side, a forwarding path and forwarding delay information sent by a controller, wherein the forwarding path and the forwarding delay information are computed by the controller according to an end-to-end delay requirement;

wherein before computing, by the controller, the forwarding path and the forwarding delay information according to the end-to-end delay requirement, the method further comprises: performing a negotiation on a time scheduling based path computation capability with the controller serving as a Path Computation Element (PCE) and the device side serving as a Path Computation Client (PCC);

wherein, in a PCC-initiate mode or a PCE-initiate mode, in a case of an Internet Protocol (IP)/Multi-Protocol Label Switching (MPLS) network, an extended bit T in an OPEN object of an OPEN message in a Path Computation Element Protocol (PCEP) indicates whether the time scheduling based path computation capability is supported; in a case of a Segment Routing (SR) network, an extended bit T in an SR-PCE-capability sub-TLV indicates whether the time scheduling based path computation capability is supported; and in a case of an SRv6 network, an extended bit T in an SRv6-PCE-capability sub-TLV indicates whether the time scheduling based path computation capability is supported;

or, in a PCE-based Central Controller (PCECC) mode, an extended bit T in a PCECC capability sub-TLV of an OPEN message indicates whether the time scheduling based path computation capability is supported.

8. The method according to claim 7, wherein before receiving, by the device side, the forwarding path and the forwarding delay information sent by the controller, the method further comprises:

sending, by the device side, a path computation request to the controller through the PCEP, wherein the controller is the PCE.

9. The method according to claim 8, wherein the path computation request is a Path Computation Request (PCReq) message based on the PCEP;

an extended bit T in a Label Switched Path (LSP)-extended-flag Type Length Value (TLV) of an LSP object is carried in the PCReq message, wherein the extended bit T indicates the time scheduling based path computation request; and an extended time-scheduling TLV in a Label Switched Path Attribute (LSPA) object is carried in the PCReq message, wherein the time-scheduling TLV is used for carrying constraints of end-to-end delay, and the constraints comprise a maximum end-to-end delay, a minimum end-to-end delay, and a maximum end-to-end delay variation.

10. The method according to claim 7, wherein in a PCC-initiate mode or a PCE-initiate mode, the device side is a head node serving as a PCC; and in a PCECC mode, the device side is a node through which the forwarding path passes.

11. The method according to claim 7, wherein in a PCC-initiate mode or a PCE-initiate mode, in a case of an Internet Protocol (IP)/Multi-Protocol Label Switching (MPLS) network, the forwarding path and the forwarding delay information are carried in an extended delay field in an Explicit Routing Object (ERO) object; in a case of a Segment Routing (SR) network, the forwarding path and the forwarding delay information are carried in an extended delay field in an SR-ERO object; and in a case of an SR version 6 (SRv6) network, the forwarding path and the forwarding delay information are carried in an extended delay field in an SRv6-ERO object;

or, in a PCECC mode, the forwarding path and the forwarding delay information are carried in a time-scheduling TLV newly added to a Central Control Instruction (CCI) object.

12. A non-transitory computer-readable storage medium, storing a computer program, wherein the computer program, when running on a processor, causes the processor to execute the method according to claim 1.

13. An electronic device, comprising a memory and a processor, wherein the memory stores a computer program, and the processor is configured to execute the method according to claim 1 when running the computer program.

14. A non-transitory computer-readable storage medium, storing a computer program, wherein the computer program, when running on a processor, causes the processor to execute the method according to claim 11.

15. An electronic device, comprising a memory and a processor, wherein the memory stores a computer program, and the processor is configured to execute the method according to claim 7 when running the computer program.

* * * * *